No. 765,352. PATENTED JULY 19, 1904.
F. R. BERGFIELD.
WIRELESS CORN PLANTER ATTACHMENT.
APPLICATION FILED FEB. 24, 1904.
NO MODEL. 2 SHEETS—SHEET 1.
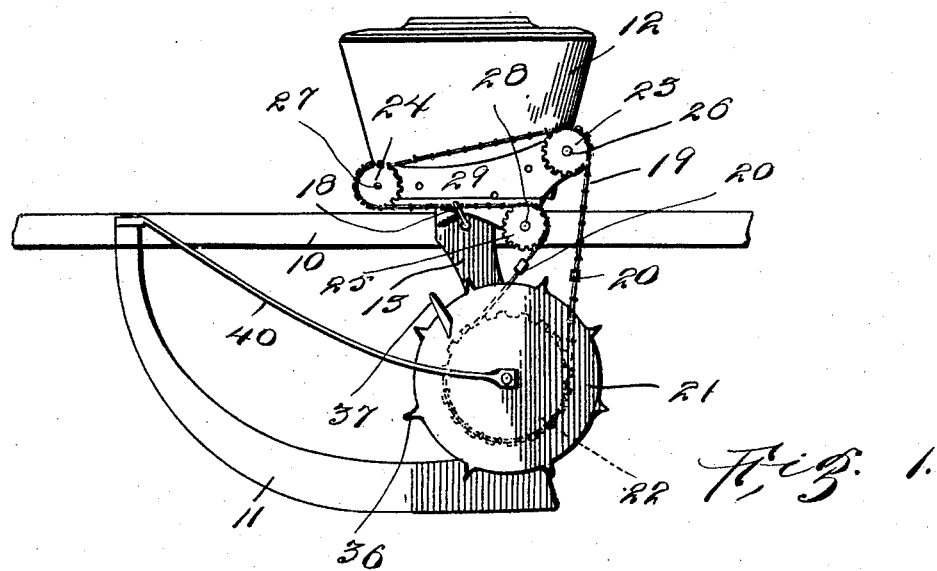
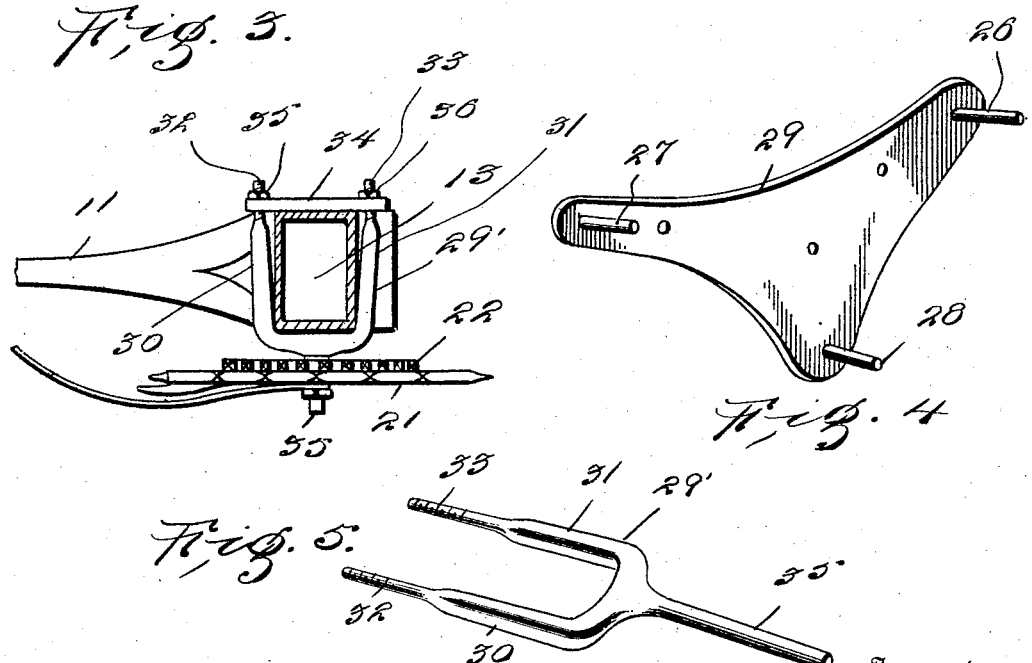
Witnesses
Inventor
F. R. Bergfield
Attorneys No. 765,352. PATENTED JULY 19, 1904.
F. R. BERGFIELD.
WIRELESS CORN PLANTER ATTACHMENT.
APPLICATION FILED FEB. 24, 1904.
NO MODEL. 2 SHEETS—SHEET 2.
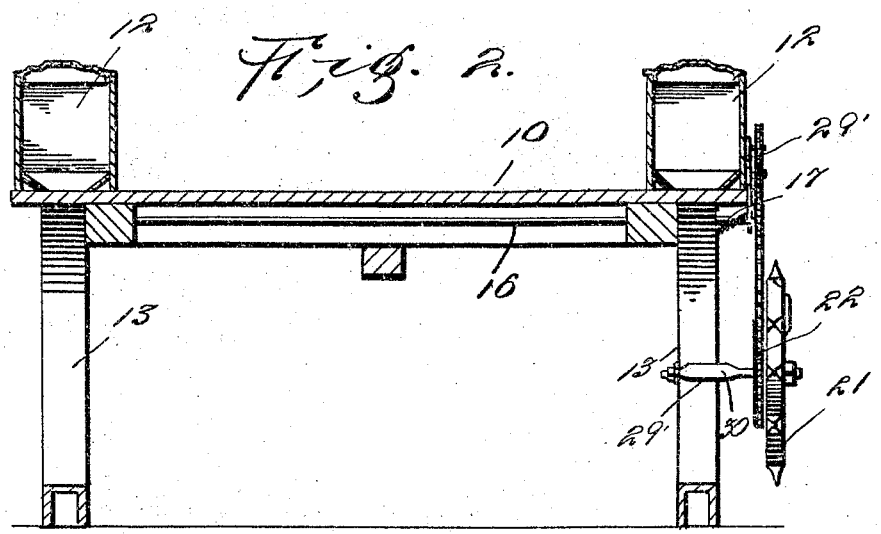
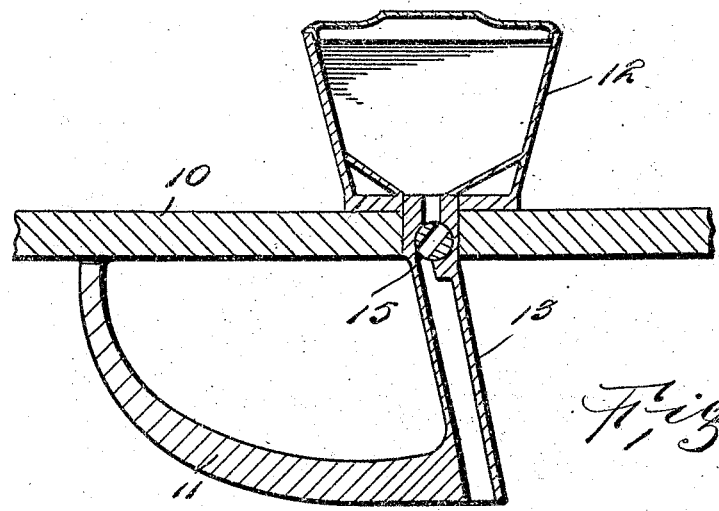
Witnesses
Inventor
F. R. Bergfield
By
Attorney No. 765,352.

Patented July 19, 1904.

UNITED STATES PATENT OFFICE.

FREDERICK R. BERGFIELD, OF ANABEL, MISSOURI.

WIRELESS CORN-PLANTER ATTACHMENT.

SPECIFICATION forming part of Letters Patent No. 765,352, dated July 19, 1904.

Application filed February 24, 1904. Serial No. 195,045. (No model.)

*To all whom it may concern:*

Be it known that I, FREDERICK R. BERGFIELD, a citizen of the United States, residing at Anabel, in the county of Macon, State of Missouri, have invented certain new and useful Improvements in Wireless Corn-Planter Attachments; and I do hereby declare the following to be a full, clear, and exact description of the invention, such as will enable others skilled in the art to which it appertains to make and use the same.

This invention relates to corn-planters, and more particularly to that class known as "check-row" planters, wherein the corn is dropped into the furrow automatically and at regular intervals in the progress of the implement, the object of the invention being to provide a construction in the form of an attachment which may be easily and quickly applied to the ordinary type of corn-planter and which will be operated without the use of the chain commonly employed for tripping the feed or discharge mechanism.

Other objects and advantages of the invention will be understood from the following description.

In the drawings forming a portion of this specification, and in which like numerals of reference indicate similar parts in the several views, Figure 1 is a side elevation showing a portion of a planter having applied thereto the attachment embodying the present invention. Fig. 2 is a vertical section taken transversely through the hoppers, the sprocket-wheels and chains, together with the ground-wheels and other parts, with the exception of the upper portions of the boots, being in elevation. Fig. 3 is a transverse section through a boot or chute, the attaching-plate for the ground-wheel together with the ground-wheel, being shown in plan. Fig. 4 is a detail view showing the casting for mounting the guide-sprocket at the side of a hopper. Fig. 5 is a detail view of the attaching-plate carrying the spindle for the ground-wheel. Fig. 6 is a vertical section through a hopper, the boot, and the dropping-valve.

Referring now to the drawings, there is shown a common type of planter including a frame 10, to which are connected the usual runners 11 for opening the furrows into which the corn is to be dropped. Above the rear end portion of each runner there is mounted upon the frame 10 a hopper 12, from the bottom of which extends downwardly and rearwardly a boot or chute 13, which conveys the grain downwardly and into the furrow opened by the runner. In the bottom of each hopper is an oscillatory valve 15 for discharging the contents of the hopper into the connected boot, the valves of the two hoppers being connected by the transverse rod 16, so that they will be actuated in unison. From the outer end of the valve of one of the hoppers projects a spindle 17, having an upwardly-directed forked finger 18, which stands close to the side of the hopper, as illustrated, and which when engaged and moved serves to swing or rock the valve in such manner as to effect the proper discharge from the hopper into the chute.

In order to actuate the arm or finger 18, a chain 19 is provided, having fixed thereon removably and at proper intervals corresponding to the spacing of the hills a series of striking-lugs 20. To move this chain so that its lugs 20 will successively strike the finger or arm 18, a ground-wheel 21 is provided, which carries a sprocket-wheel 22, with which the chain is engaged, said chain passing around direction sprocket-wheels 23, 24, and 25. The direction sprocket-wheels are mounted upon the spindles 26, 27, and 28, respectively, at the corners of a substantially triangular bracket 29, which is secured to the side of the hopper at one side of the implement by means of bolts or in any other suitable way, the sprocket-wheels being so positioned that the chain in passing from the sprocket-wheel 24 to the sprocket-wheel 25 will carry its lugs 20 against the finger 18.

The ground-wheel 21, with its sprocket-wheel 22, is supported from a chute or boot at one side of the machine through the medium of a bracket 29', having the arms 30 and 31 at one end, which embrace the chute and are formed into bolts 32 and 33 at their extremities, which are passed through a back plate 34, against which impinge the nuts 35 and 36, which are screwed onto the bolt and serve to clamp the chute or boot between the bracket 29' and the plate 34. The bracket 29' has a spindle at its opposite end from the arms 30 and 31, this spindle being shown at 35, and upon this spindle is rotatably mounted the wheel 21, with wheel 22 fixed thereto, the wheels 23, 24, 25, and 22 being in the same vertical plane.

The wheel 21 has radiating spikes or cleats 36 on its periphery, and the wheel is of such diameter that these spikes will engage in the ground at the side of the furrow, so that the wheel will be positively rotated as the implement advances. Upon the periphery of the wheel 21 is secured also a large cleat 37, which is so positioned that it will mark the ground at the point where the seeds are deposited, so that by noting the marks made by this cleat or marker the hills that are planted may be caused to aline in transverse series, as well as longitudinally of the field, it being understood that one or more markers may be employed corresponding to the positions of striking-lugs 20 and the intervals between the hills.

In order to hold the spindle of the ground-wheel against lateral displacement, a brace-rod 40 is connected to the free end of the spindle and to the forward portion of the runner.

What is claimed is—

1. The combination with a planter comprising a frame, a runner connected to the frame, a hopper mounted upon the frame and a chute connected between the hopper and the runner, said hopper having a discharge-valve for communicating intermittently with the chute, of a bracket removably secured to the chute and provided with a spindle, a ground-wheel mounted upon the spindle and provided with a concentric sprocket-wheel, a bracket removably secured to the hopper and having a plurality of spindles, direction sprocket-wheels mounted upon the spindles, a chain engaged over the sprocket-wheels and a striker upon the chain disposed to engage and operate the valve through the forked finger.

2. The combination with a planter comprising a hopper, a chute leading from the hopper and a discharge-valve, of a bracket having a clamp removably engaged with the chute, said bracket having a spindle, a ground-wheel mounted upon the spindle and provided with a concentric sprocket-wheel, a plate attached to the hopper and provided with a plurality of spindles, sprocket-wheels mounted upon the last-named spindles in the plane of the first-named sprocket-wheel, and a chain engaged with the sprockets and provided with a striking-lug movable with the chain to engage and operate the discharge-valve.

In testimony whereof I affix my signature in presence of two witnesses.

FRED. R. BERGFIELD.

Witnesses:
J. C. WHITTEN,
W. L. HOWARD.